United States Patent
Morisaki

(10) Patent No.: US 10,737,685 B2
(45) Date of Patent: Aug. 11, 2020

(54) HYBRID VEHICLE AND CONTROL DEVICE MOUNTED THEREON

(71) Applicant: TOYOTA JIDOSHA KABUSHIKI KAISHA, Toyota-shi, Aichi-ken (JP)

(72) Inventor: Keisuke Morisaki, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 73 days.

(21) Appl. No.: 16/208,051

(22) Filed: Dec. 3, 2018

(65) Prior Publication Data

US 2019/0168741 A1  Jun. 6, 2019

(30) Foreign Application Priority Data

Dec. 5, 2017 (JP) ................................. 2017-233644

(51) Int. Cl.
*B60W 20/13* (2016.01)
*B60K 6/20* (2007.10)
*B60W 10/06* (2006.01)
*B60W 10/08* (2006.01)

(52) U.S. Cl.
CPC ............ *B60W 20/13* (2016.01); *B60K 6/20* (2013.01); *B60W 10/06* (2013.01); *B60W 10/08* (2013.01); *B60W 2510/244* (2013.01); *B60W 2710/06* (2013.01); *B60W 2710/08* (2013.01)

(58) Field of Classification Search
None
See application file for complete search history.

(56) References Cited

U.S. PATENT DOCUMENTS

| | | | |
|---|---|---|---|
| 9,121,356 B2* | 9/2015 | Boesch | F02D 29/02 |
| 2010/0280687 A1* | 11/2010 | Tate, Jr. | B60W 10/26 |
| | | | 701/22 |
| 2014/0203759 A1* | 7/2014 | Sugiyama | B60L 1/003 |
| | | | 320/104 |
| 2014/0236459 A1* | 8/2014 | Boesch | F02N 11/0825 |
| | | | 701/112 |
| 2017/0120888 A1 | 5/2017 | Jinno | |
| 2018/0118195 A1* | 5/2018 | Magarida | B60W 10/20 |

FOREIGN PATENT DOCUMENTS

| | | | |
|---|---|---|---|
| JP | 2008-132837 A | | 6/2008 |
| JP | 2012153257 A | * | 8/2012 |
| JP | 2017-081416 A | | 5/2017 |

\* cited by examiner

*Primary Examiner* — Shelley Chen
(74) *Attorney, Agent, or Firm* — Sughrue Mion, PLLC

(57) ABSTRACT

When parking is expected at a predetermined point, state of charge reduction control is performed in a current trip to control an engine and a motor, such that the state of charge of a power storage device is lower than the state of charge of the power storage device when parking is not expected at the predetermined point. State of charge recovery control is performed in a next trip to control the engine and the motor, such that the state of charge is recovered during operation of the engine. When parking is expected at the predetermined point but an instruction for motor drive is estimated to be given in a predetermined time period or in a predetermined distance since a start of a next trip that is started at the predetermined point, execution of the state of charge reduction control is limited in the current trip.

10 Claims, 11 Drawing Sheets

HYBRID VEHICLE AND CONTROL DEVICE MOUNTED THEREON

CROSS-REFERENCE TO RELATED APPLICATIONS

The present disclosure claims priority to Japanese Patent Application No. 2017-233644 filed Dec. 5, 2017, which is incorporated herein by reference in its entirety including specification, drawings and claims.

TECHNICAL FIELD

The present disclosure relates to a hybrid vehicle and a control device mounted thereon and more specifically relates to a hybrid vehicle including an engine, a motor and a power storage device as well as to a control device mounted on such a hybrid vehicle.

BACKGROUND

A hybrid vehicle includes an engine, a motor and a battery and is configured to control the engine and the motor such that the hybrid vehicle is driven with the state of charge of the battery approaching a target state of charge. A proposed configuration of the hybrid vehicle changes the target state of charge of the battery to a special target state of charge that is lower than a basic target state of charge when the hybrid vehicle reaches a point that is a predetermined distance prior to a parking point (destination) where a parking time is expected to be longer than a predetermined time period, in a driving route of the hybrid vehicle, and returns the target state of charge to the basic target state of charge when the hybrid vehicle restarts from the parking point in a next trip (as described in, for example, JP 2017-81416A). The hybrid vehicle of this proposed configuration enables the state of charge of the battery at a restart from the parking point to be sufficiently lower than the basic target state of charge (to be close to the special target state of charge) by such control. This applies a load to the engine and enhances the charging (cold charging) efficiency of the battery in an engine drive (cold drive) serving to warm up the engine.

SUMMARY

The hybrid vehicle described above provides a sufficiently lower state of charge of the battery at the time of a restart from the parking point than the basic target state of charge (to be close to the special target state of charge). When an instruction for motor drive, which causes the hybrid vehicle to be driven without operation of the engine, is given relatively soon after the restart, there is a possibility of shortening motor-drivable distance and time, due to the low state of charge of the battery (i.e., a small amount of dischargeable power).

A hybrid vehicle and a control device mounted thereon of the present disclosure mainly aims to suppress motor-drivable distance and time from being shortened when an instruction for motor drive is given.

In order to achieve the above primary object, the hybrid vehicle and a control device mounted thereon of the present disclosure employs the following configuration.

The present disclosure is directed to a hybrid vehicle. The hybrid vehicle includes an engine, a motor, a power storage device configured to transmit electric power to and from the motor and a control device configured to, when parking is expected at a predetermined point, perform state of charge reduction control in a current trip and to perform state of charge recovery control in a next trip. The state of charge reduction control controls the engine and the motor such that state of charge of the power storage device when parking is expected at the predetermined point is lower than the state of charge of the power storage device when parking is not expected at the predetermined point, and the state of charge recovery control controls the engine and the motor such that the state of charge of the power storage device is recovered during operation of the engine. When parking is expected at the predetermined point but an instruction for motor drive, which causes the hybrid vehicle to be driven without operation of the engine, is estimated to be given in a predetermined time period or in a predetermined distance since a start of a next trip that is started at the predetermined point, the control device limits execution of the state of charge reduction control in the current trip.

When parking is expected at the predetermined point, the hybrid vehicle of this aspect performs the state of charge reduction control in the current trip to control the engine and the motor, such that the state of charge of the power storage device when parking is expected at the predetermined point is lower than the state of charge of the power storage device when parking is not expected at the predetermined point. The hybrid vehicle also performs the state of charge recovery control in the next trip to control the engine and the motor, such that the state of charge of the power storage device is recovered during operation of the engine. When parking is expected at the predetermined point but the instruction for motor drive, which causes the hybrid vehicle to be driven without operation of the engine, is estimated to be given in the predetermined time period or in the predetermined distance since the start of the next trip that is started at the predetermined point, the hybrid vehicle of this aspect limits execution of the state of charge reduction control in the current trip. This configuration suppresses the motor-drivable distance and time from being shortened when the instruction for motor drive is given in the predetermined time period or in the predetermined distance since the start of the next trip (i.e., when the instruction for motor drive is given relatively soon). The "predetermined time period" and the "predetermined distance" may be a fixed time period and a fixed distance or may be a variable time period and a variable distance. The "limitation of execution of the state of charge reduction control" includes execution of second state of charge reduction control that limits the amount of reduction in the state of charge of the power storage device compared with the state of charge reduction control, and prohibition of execution of the state of charge reduction control.

The present disclosure is directed to a control device mounted on a hybrid vehicle. The hybrid vehicle includes an engine, a motor, and a power storage device configured to transmit electric power to and from the motor. The control device is configured to, when parking is expected at a predetermined point, perform state of charge reduction control in a current trip and to perform state of charge recovery control in a next trip, wherein the state of charge reduction control controls the engine and the motor such that state of charge of the power storage device when parking is expected at the predetermined point is lower than the state of charge of the power storage device when parking is not expected at the predetermined point, and the state of charge recovery control controls the engine and the motor such that the state of charge of the power storage device is recovered during operation of the engine. When parking is expected at the predetermined point but an instruction for motor drive, which causes the hybrid vehicle to be driven without operation of the engine, is estimated to be given in a predetermined time period or in a predetermined distance since a start of a next trip that is started at the predetermined point, the control device limits execution of the state of charge reduction control in the current trip.

When parking is expected at the predetermined point, the control device of this aspect performs the state of charge reduction control in the current trip to control the engine and the motor, such that the state of charge of the power storage device when parking is expected at the predetermined point is lower than the state of charge of the power storage device when parking is not expected at the predetermined point. The control device also performs the state of charge recovery control in the next trip to control the engine and the motor, such that the state of charge of the power storage device is recovered during operation of the engine. When parking is expected at the predetermined point but the instruction for motor drive, which causes the control device to be driven without operation of the engine, is estimated to be given in the predetermined time period or in the predetermined distance since the start of the next trip that is started at the predetermined point, the control device of this aspect limits execution of the state of charge reduction control in the current trip. This configuration suppresses the motor-drivable distance and time from being shortened when the instruction for motor drive is given in the predetermined time period or in the predetermined distance since the start of the next trip (i.e., when the instruction for motor drive is given relatively soon). The "predetermined time period" and the "predetermined distance" may be a fixed time period and a fixed distance or may be a variable time period and a variable distance. The "limitation of execution of the state of charge reduction control" includes execution of second state of charge reduction control that limits the amount of reduction in the state of charge of the power storage device compared with the state of charge reduction control, and prohibition of execution of the state of charge reduction control.

DESCRIPTION OF EMBODIMENTS

The following describes some aspects of the disclosure with reference to embodiments.

Figure 1:
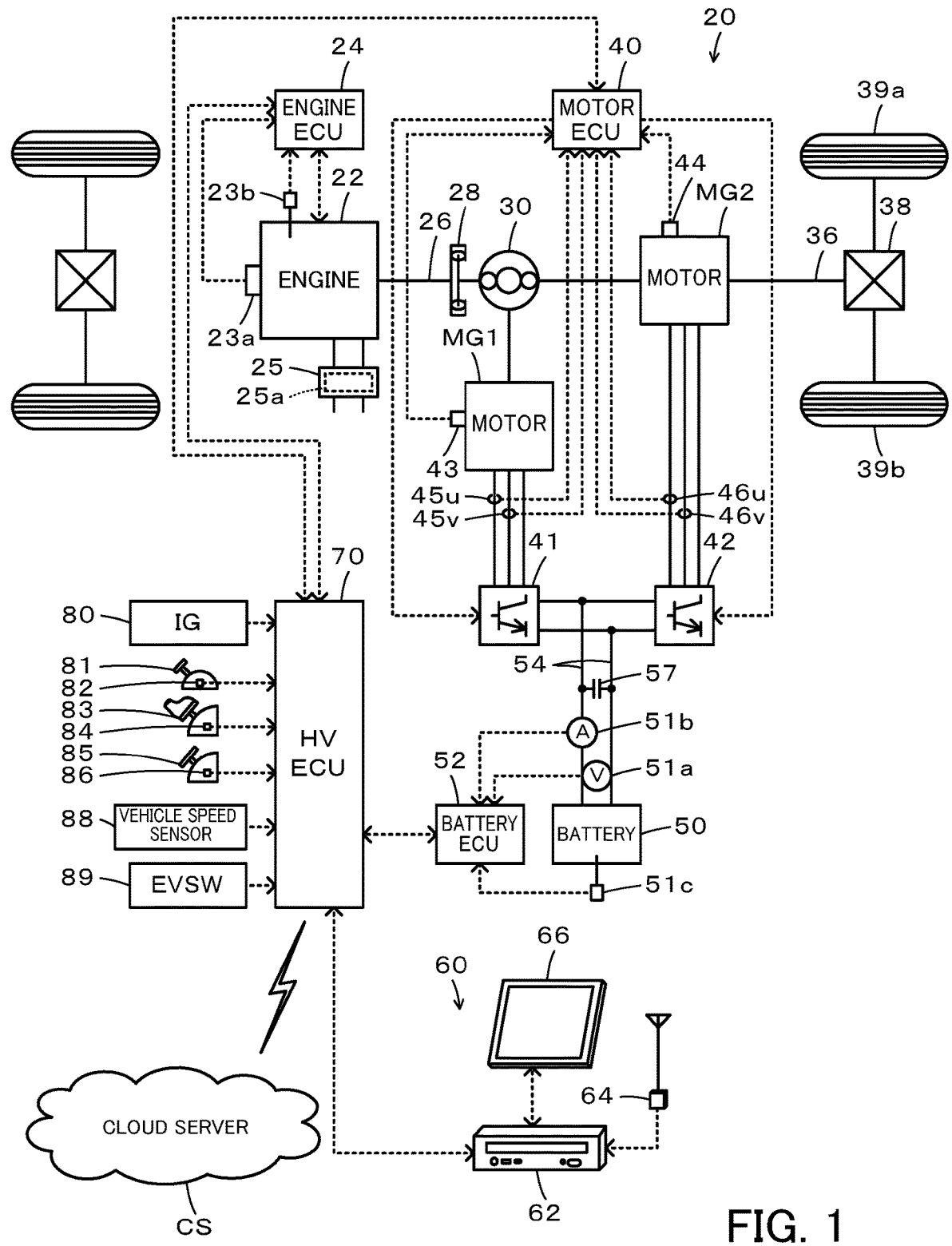
FIG. 1 is a configuration diagram illustrating the schematic configuration of a hybrid vehicle according to an embodiment of the present disclosure.

FIG. 1 is a configuration diagram illustrating the schematic configuration of a hybrid vehicle 20 according to an embodiment of the present disclosure. As illustrated, the hybrid vehicle 20 of the embodiment includes an engine 22, a planetary gear 30, motors MG1 and MG2, inverters 41 and 42, a battery 50 as a power storage device, a vehicle-mounted navigation system 60, and a hybrid electronic control unit (hereinafter referred as "HVECU") 70.

The engine 22 is configured as an internal combustion engine that outputs power using, for example, gasoline or light oil as a fuel and is connected with a carrier of the planetary gear 30 via a damper 28. An exhaust emission control device 25 filled with a catalyst 25a for exhaust emission control of the engine 22 is provided in an exhaust system of the engine 22. The engine 22 is operated and controlled by an engine electronic control unit (hereinafter referred to as "engine ECU") 24.

The engine ECU 24 is configured as a CPU-based microprocessor and includes a ROM configured to store processing programs, a RAM configured to temporarily store data, input/output ports and a communication port, in addition to the CPU, although not being illustrated. Signals from various sensors required for operation control of the engine 22, for example, a crank angle θcr from a crank position sensor 23a configured to detect the rotational position of a crankshaft 26 of the engine 22 and a cooling water temperature Tw from a water temperature sensor 23b configured to detect the temperature of cooling water of the engine 22, are input into the engine ECU 24 via the input port. Various control signals for operation control of the engine 22 are output from the engine ECU 24 via the output port. The engine ECU 24 is connected with the HVECU 70 via the respective communication ports. The engine ECU 24 calculates a rotation speed Ne of the engine 22, based on the crank angle θcr input from the crank position sensor 23a, while estimating a temperature Tc of the catalyst 25a (catalyst temperature Tc), based on, for example, the cooling water temperature Tw input from the water temperature sensor 23b.

The planetary gear 30 is configured as a single pinion-type planetary gear mechanism. The planetary gear 30 includes a sun gear that is connected with a rotor of the motor MG1. The planetary gear 30 also includes a ring gear that is connected with a driveshaft 36 which is coupled with drive wheels 39a and 39b via a differential gear 38. The planetary gear 30 further includes a carrier that is connected with the crankshaft 26 of the engine 22 via the damper 28.

The motor MG1 may be configured, for example, as a synchronous generator motor and includes the rotor that is connected with the sun gear of the planetary gear 30 as described above. The motor MG2 may be configured, for example, as a synchronous generator motor and includes a rotor that is connected with the driveshaft 36. The inverters 41 and 42 are used to respectively drive the motors MG1 and MG2 and are connected with the battery 50 via power lines 54. A capacitor 57 for smoothing is mounted to the power lines 54. A motor electronic control unit (hereinafter referred to as "motor ECU") 40 performs switching control of a plurality of switching elements (not shown) respectively included in the inverters 41 and 42, so as to rotate and drive the motors MG1 and MG2.

The motor ECU 40 is configured as a CPU-based microprocessor and includes a ROM configured to store processing programs, a RAM configured to temporarily store data, input/output ports and a communication port, in addition to the CPU, although not being illustrated. Signals from various sensors required for drive control of the motors MG1 and MG2, for example, rotational positions $\theta m1$ and $\theta m2$ from rotational position detection sensors 43 and 44 configured to detect the rotational positions of the respective rotors of the motors MG1 and MG2, phase currents Iu1, Iv1, Iu2 and Iv2 from current sensors 45$u$, 45$v$, 46$u$ and 46$v$ configured to detect electric currents flowing in the respective phases of the motors MG1 and MG2 are input into the motor ECU 40 via the input port. The motor ECU 40 outputs via the output port, for example, switching control signals to the plurality of switching elements included in the respective inverters 41 and 42. The motor ECU 40 is connected with the HVECU 70 via the respective communication ports. The motor ECU 40 calculates electrical angles $\theta e1$ and $\theta e2$, angular velocities $\omega m1$ and $\omega m2$ and rotation speeds Nm1 and Nm2 of the respective motors MG1 and MG2, based on the rotational positions $\theta m1$ and $\theta m2$ of the respective rotors of the motors MG1 and MG2 input from the rotational position detection sensors 43 and 44.

The battery 50 is configured as, for example, a lithium ion rechargeable battery or a nickel metal hydride battery and is connected with the power lines 54. This battery 50 is under management of a battery electronic control unit (hereinafter referred to as "battery ECU") 52.

The battery ECU 52 is configured as a CPU-based microprocessor and includes a ROM configured to store processing programs, a RAM configured to temporarily store data, input/output ports and a communication port, in addition to the CPU, although not being illustrated. Signals from various sensors required for management of the battery 50 are input into the battery ECU 52 via the input port. The signals input into the battery ECU 52 include, for example, a voltage Vb of the battery 50 from a voltage sensor 51$a$ placed between terminals of the battery 50, an electric current Ib of the battery 50 from a current sensor 51$b$ mounted to an output terminal of the battery 50, and a temperature Tb of the battery 50 from a temperature sensor 51$c$ mounted to the battery 50. The battery ECU 52 is connected with the HVECU 70 via the respective communication ports. The battery ECU 52 calculates a state of charge SOC, based on an integrated value of the electric current Ib of the battery 50 input from the current sensor 51$b$. The battery ECU 52 also calculates an input limit Win and an output limit Wout, based on the calculated state of charge SOC and the temperature Tb of the battery 50 input from the temperature sensor 51$c$. The state of charge SOC denotes a ratio of the capacity of electric power dischargeable from the battery 50 to the overall capacity of the battery 50. The input limit Win and the output limit Wout denote an allowable charging power and an allowable discharging power that are chargeable into and dischargeable from the battery 50.

The vehicle-mounted navigation system 60 includes a main body 62 provided with a built-in storage medium such as a hard disk drive, in which map information and the like are stored, and with a built-in controller having input/output ports and a communication port; a GPS antenna 64 provided to receive information regarding the current location of the own vehicle; and a touch panel display 66 configured to display the information regarding the current location of the own vehicle, an estimated driving route to a destination, and the like and to allow the user to enter various instructions. The map information is stored in the form of a database and includes service information (for example, tourism information and parking places) and road information of predetermined respective driving intervals (for example, intervals between traffic lights and intervals between intersections). The road information includes distance information, road width information, number of lanes information, district information (urban or suburban), road type information (general road, expressway, toll road), slope information, legal speed limits, and the number of signals. The vehicle-mounted navigation system 60 is connected with the HVECU 70 via the respective communication ports.

When the user operates the display 66 to set a destination, this vehicle-mounted navigation system. 60 sets an estimated driving route from the current location of the vehicle to the destination, based on the map information, the current location of the own vehicle and the user's set destination, displays the set estimated driving route on the display 66, and performs route guidance.

The HVECU 70 is configured as a CPU-based microprocessor and includes a ROM configured to store processing programs, a RAM configured to temporarily store data, input/output ports and a communication port, in addition to the CPU, although not being illustrated. Signals from various sensors are input into the HVECU 70 via the input port. The signals input into the HVECU 70 include, for example, an ignition signal from an ignition switch 80 and a shift position SP from a shift position sensor 82 configured to detect an operating position of a shift lever 81. The input signals also include an accelerator position Acc from an accelerator pedal position sensor 84 configured to detect a depression amount of an accelerator pedal 83, a brake pedal position BP from a brake pedal position sensor 86 configured to detect a depression amount of a brake pedal 85, a vehicle speed V from a vehicle speed sensor 88 and the setting of an EV switch 89 operated to give an instruction for driving in an EV drive mode described later. The HVECU 70 is connected with the engine ECU 24, the motor ECU 40, the battery ECU 52 and the vehicle-mounted navigation system 60 via the respective communication ports as described above. The HVECU 70 is also configured to be communicable with a cloud server CS by wireless communication.

The cloud server CS is configured to be communicable with respective vehicles including the hybrid vehicle 20 by wireless communication and has driving history information of the respective vehicles accumulated therein. The driving history information includes, for example, a parking position, the date and time of parking, and a parking time. In the description below, a parking having the parking time longer than a predetermined time period T1 (for example, five hours, six hours or seven hours) is called "long time parking", and a parking having the parking time equal to or shorter than the predetermined time period T1 is called "short time parking". A point of the long time parking in a past trip is called "long time parking point", and a point of the short time parking in a past trip is called "short time parking point". When a certain point corresponds to both the long time parking point and the short time parking point, the certain point may be set as either the long time parking point or the short time parking point according to the day of the week and the time of day or may be set as either the long time parking point or the short time parking point according to the average parking time or the like. The predetermined time period T1 is determined, for example, as a time period required to sufficiently cool down the engine 22 and the catalyst 25a. The predetermined time period T1 may be a fixed time or may be a variable time that may be varied according to the ambient temperature or the like.

The cloud server CS also estimates a destination (point of arrival) of a current trip with regard to each vehicle by referring to its long time parking points and short time parking points, based on the driving history information and a starting position of the current trip (starting point). For example, when the starting point is a point A (for example, the user's home) in the morning of a weekday, a point B (for example, the user's working place) is estimated as a destination. When the starting point is other than the point A in the afternoon of a weekday or in a weekend, the point A is estimated as a destination. When the starting point is the point A in the afternoon of a weekday or in a weekend, the destination cannot be estimated (destination is unknown).

The hybrid vehicle 20 of the embodiment having the above configuration may be driven in a hybrid drive mode (HV drive mode) with operation of the engine 22 or may be driven in a motor drive mode (EV drive mode) with no operation of the engine 22.

Figure 2:
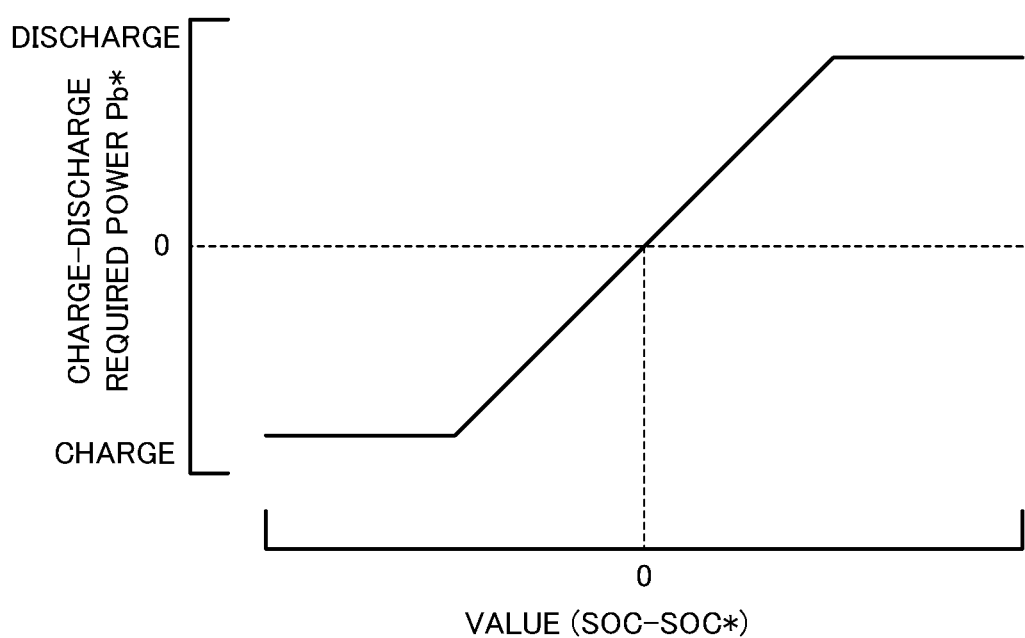
FIG. 2 is a diagram illustrating one example of a charge-discharge required power setting map.

In the HV drive mode, the HVECU 70 sets a required torque Td* that is required for the driveshaft 36, based on the accelerator position Acc and the vehicle speed V, and calculates a required power Pd* that is required for the driveshaft 36 by multiplying the set required torque Td* by a rotation speed Nd of the driveshaft 36 (rotation speed Nm2 of the motor MG2). The HVECU 70 subsequently sets a charge-discharge required power Pb* which the battery 50 requires (and which takes a positive value when the battery 50 is discharged), based on the state of charge SOC and a target state of charge SOC* of the battery 50. The target state of charge SOC* of the battery 50 is set according to a target state of charge setting routine described later. The charge-discharge required power Pb* of the battery 50 is set, such that a difference (SOC−SOC*) by subtracting the target state of charge SOC* from the state of charge SOC of the battery 50 becomes close to a value 0 (i.e., approaches zero). FIG. 2 is a diagram illustrating one example of a charge-discharge required power setting map. As illustrated, the charge-discharge required power Pb* of the battery 50 is set to a value 0 when the difference (SOC−SOC*) is a value 0, is set to a value having a tendency of increasing the absolute value in a positive range (i.e., range for discharging) with an increase in the difference (SOC−SOC*) when the difference (SOC−SOC*) is a positive value, and is set to a value having a tendency of increasing the absolute value in a negative range (i.e., range for charging) with a decrease in the difference (SOC−SOC*) when the difference (SOC−SOC*) is a negative value.

The HVECU 70 subsequently sets a required power Pe* that is required for the engine 22 by subtracting the charge-discharge required power Pb* of the battery 50 from the required power Pd*, and sets a target rotation speed Ne* and a target torque Te* of the engine 22 and torque commands Tm1* and Tm2* of the motors MG1 and MG2, such that the required power Pe* is output from the engine 22 and that the required torque Td* is output to the driveshaft 36 within the range of the input limit Win and the output limit Wout of the battery 50. The HVECU 70 then sends the target rotation speed Ne* and the target torque Te* of the engine 22 to the engine ECU 24, while sending the torque commands Tm1* and Tm2* of the motors MG1 and MG2 to the motor ECU 40. When receiving the target rotation speed Ne* and the target torque Te* of the engine 22, the engine ECU 24 performs operation control of the engine 22 (for example, intake air flow control, fuel injection control and ignition control), such that the engine 22 is operated with the target rotation speed Ne* and the target torque Te*. When receiving the torque commands Tm1* and Tm2* of the motors MG1 and MG2, the motor ECU 40 performs switching control of the plurality of switching elements included in the inverters 41 and 42, such that the motors MG1 and MG2 are driven with the torque commands Tm1* and Tm2*.

In this HV drive mode, it is determined that a stop condition of the engine 22 is met, upon satisfaction of all conditions, for example, a condition that the required power Pe* is lower than a stop reference value Pstop, a condition that neither a request for warming up the engine 22 nor a request for warming up the catalyst 25a is made, and a condition that no request is made for heating the passenger compartment using the engine 22 as a heat source. When the stop condition is met, the HVECU 70 stops operation of the engine 22 and shifts the drive mode to the EV drive mode. The request for warming up the engine 22 is made when the cooling water temperature Tw of the engine 22 is lower than a predetermined temperature Twref (for example, 70° C., 75° C. or 80° C.). The request for warming up the catalyst 25a is made when the temperature Tc of the catalyst 25a (catalyst temperature Tc) is lower than a predetermined temperature Tcref (for example, 350° C., 400° C. or 450° C.)

In the EV drive mode, the HVECU 70 sets the required torque Td* that is required for the driveshaft 36, based on the accelerator position Acc and the vehicle speed V. The HVECU 70 subsequently sets a value 0 to the torque command Tm1* of the motor MG1 and sets the torque command Tm2* of the motor MG2, such that the required torque Td* is output to the driveshaft 36 within the range of the input limit Win and the output limit Wout of the battery 50. The HVECU 70 then sends the torque commands Tm1* and Tm2* of the motors MG1 and MG2 to the motor ECU 40. The motor ECU 40 controls the inverters 41 and 42 as described above.

In this EV drive mode, it is determined that a start condition of the engine 22 is met, upon satisfaction of at least one of conditions, for example, a condition that the required power Pe* calculated in the same manner as that in the HV drive mode is equal to or higher than a start reference value Pstart, a condition that a request is made for warming up the engine 22 or for warming up the catalyst 25a, and that a request is made for heating the passenger compartment. When the start condition is met, the HVECU 70 starts the engine 22 and shifts the drive mode to the HV drive mode. The start reference value Pstart is preferably a larger value than the stop reference value Pstop by a certain margin (for example, about several kW), in order to suppress frequent changeover between the start and the stop of the engine 22 within a short time period.

Figure 3:
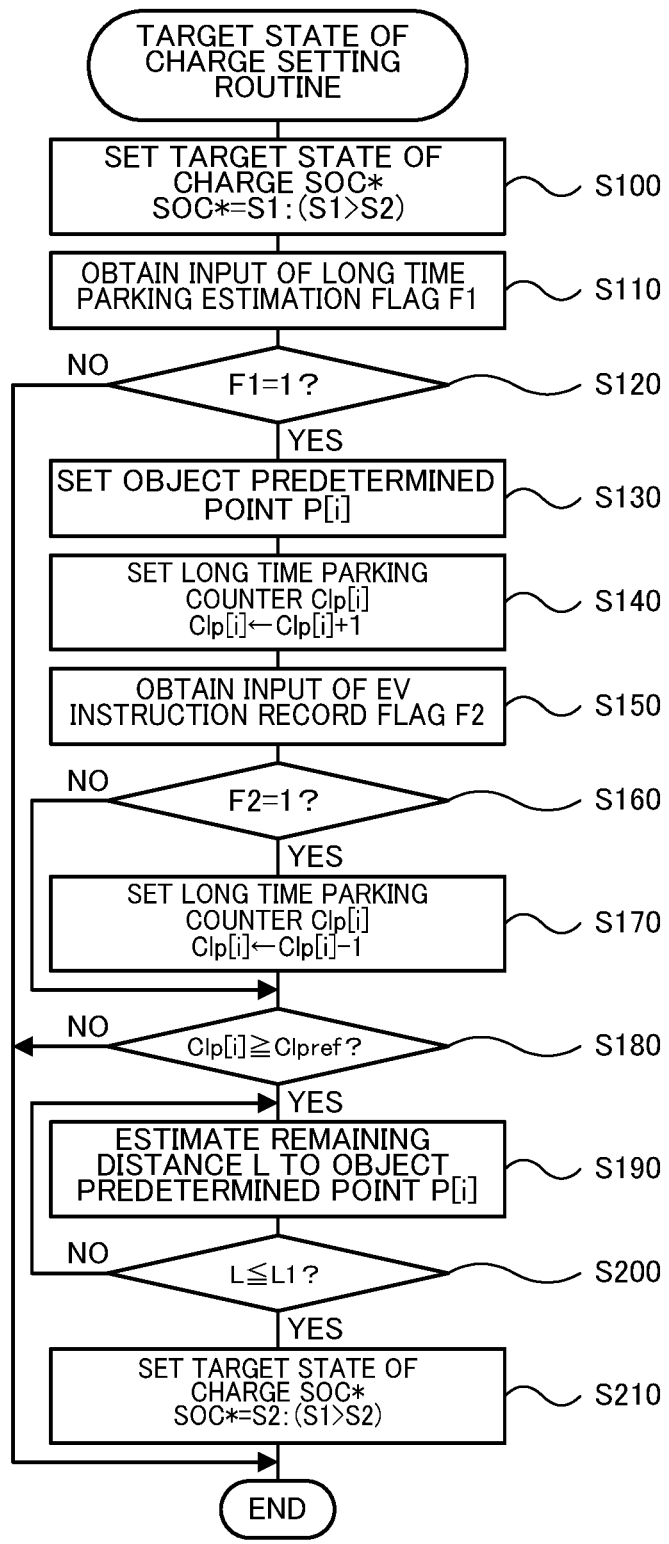
FIG. 3 is a flowchart showing one example of a target state of charge setting routine performed by HVECU.

The following describes the operations of the hybrid vehicle 20 of the embodiment having the above configuration and more specifically a series of processing to set the target state of charge SOC* of the battery 50. FIG. 3 is a flowchart showing one example of a target state of charge setting routine performed by the HVECU 70. This routine is performed at the start of each trip (when the ignition switch 80 is turned ON).

When the target state of charge setting routine shown in FIG. 3 is triggered, the HVECU 70 first sets a predetermined value S1 to the target state of charge SOC* of the battery 50 (step S100). The predetermined value S1 used herein may be, for example, 58%, 60% or 62%.

The HVECU 70 subsequently obtains the input of a long time parking estimation flag F1 (step S110) and checks the value of the input long time parking estimation flag F1 (step S120). The long time parking estimation flag F1 input here is set to a value 1 when a long time parking is expected at a predetermined point, while being set to a value 0 when the long time parking is not expected. The "predetermined point" denotes a position where there is a possibility of a long time parking and may be, for example, the user's home, the user's working place, a shopping mall, a leisure facility or an accommodation facility. The "predetermined points" include points set (registered) in advance prior to shipment of the vehicle, points set (registered) through the user's operations of the display 66, and long time parking points input from the cloud server CS by wireless communication.

The determination of whether a long time parking is expected at a predetermined point may be made as described below. When a destination is set by the user, this determination may be based on determination of whether the set destination is included in the predetermined points and based on determination of whether an expected arrival time to the set destination is included in the day of the week and the time of day when the long time parking is expected. When no destination is set by the user, on the other hand, this determination may be based on determination of whether a destination is estimated by the cloud server CS, based on determination of whether the estimated destination is included in the predetermined points, and based on determination of whether an expected arrival time to the estimated destination is included in the day of the week and the time of day when the long time parking is expected. A certain time period is required between the start of a trip to the user's setting of a destination. The processing of step S110 may accordingly be performed when a destination is set by the user, when a certain time period has elapsed, or the hybrid vehicle 20 is driven by a certain distance after the processing of step S100 is performed.

When the long time parking estimation flag F1 is equal to the value 0 at step S120, the HVECU 70 determines that along time parking is not expected at the predetermined point and terminates this routine. In this case, the target state of charge SOC* of the battery 50 is kept at the value S1 until the end of the current trip.

When the long time parking estimation flag F1 is equal to the value 1 at step S120, on the other hand, the HVECU 70 determines that a long time parking is expected at the predetermined point. The HVECU 70 accordingly sets either a destination set by the user or a destination estimated by the cloud server CS as an object predetermined point P[i] (step S130) and increments a long term parking counter Clp[i] corresponding to the object predetermined point P[i] by a value 1 (step S140). Herein [i] represents a number corresponding to each place, such as the user's home, the user's working place, a shopping mall, a leisure facility, or an accommodation facility. A value 0 is set as an initial value to the long time parking counter Clp[i], for example, at the time of factory shipment.

The HVECU 70 subsequently obtains the input of an EV instruction record flag F2 (step S150) and checks the value of the EV instruction record flag F2 (step S160). The EV instruction record flag F2 input here is set to a value 1 when the EV switch 89 has been turned ON in a predetermined time period T2 (for example, about several minutes) since the start of a last trip that has been started at the object predetermined point P[i], while being set to a value 0 when the EV switch 89 has not been turned ON.

When the EV instruction record flag F2 is equal to the value 1 at step S160, the HVECU 70 determines that the EV switch 89 has been turned ON in the predetermined time period T2 since the start of the last trip that has been started at the object predetermined point P[i] and decrements the long time parking counter Clp[i] corresponding to the object predetermined point P[i] by a value 1 (step S170). When the EV instruction record flag F2 is equal to the value 0 at step S160, on the other hand, the HVECU 70 determines that the EV switch 89 has not been turned ON in the predetermined time period T2 since the start of the last trip that has been started at the object predetermined point P[i] and does not decrement but maintains the setting of the long time parking counter Clp[i] (i.e., does not perform the processing of step S170).

Accordingly, when a long time parking is expected at a predetermined point (object predetermined point P[i]) and the EV switch 89 has not been turned ON in the predetermined time period T2 since the start of the last trip that has been started at the object predetermined point P[i], the long time parking counter Clp[i] corresponding to the object predetermined point P[i] is incremented by the value 1. When a long time parking is expected at a predetermined point (object predetermined point P[i]) and the EV switch 89 has been turned ON in the predetermined time period T2 since the start of the last trip that has been started at the object predetermined point P[i], on the other hand, the long time parking counter Clp[i] is maintained (not incremented).

The HVECU 70 subsequently compares the long time parking counter Clp[i] corresponding to the object predetermined point P[i] with a reference value Clpref (step S180). The reference value Clpref is a threshold value used to estimate (determine) whether the EV switch 89 is turned ON or not in the predetermined time period T2 since the start of a next trip that is started at the object predetermined point P[i] and may be, for example, a value 3, a value 4 or a value 5. The reference value Clpref may be a uniform value for respective predetermined points or may be different values for the respective predetermined points.

When the long time parking counter Clp[i] corresponding to the object predetermined point P[i] is equal to or larger than the reference value Clpref at step S180, the HVECU 70 estimates (determines) that the EV switch 89 is not turned ON in the predetermined time period T2 since the start of a next trip that is started at the object predetermined point P[i]. The HVECU 70 accordingly estimates a remaining distance L to the object predetermined point P[i], based on the current location, the destination and the map information (step S190) and compares the estimated remaining distance L with a predetermined distance L1 (for example, 3 km, 4 km or 5 km) (step S200). When the remaining distance L is longer than the predetermined distance L1, the HVECU 70 goes back to step S190. The HVECU 70 repeats the processing of steps S190 and S200 until the remaining distance L to the object predetermined point P[i] becomes equal to or shorter than the predetermined distance L1.

When it is determined at step S200 that the remaining distance L to the object predetermined point P[i] becomes equal to or shorter than the predetermined distance L1, the HVECU 70 sets a predetermined value S2 that is lower than the predetermined value S1, to the target state of charge SOC* of the battery 50 (step S210) and then terminates this routine. The predetermined value S2 used herein may be, for example, 48%, 50% or 52%.

In this case, state of charge reduction control is performed to reduce the state of charge SOC of the battery 50 by changing the target state of charge SOC* of the battery 50 from the predetermined value S1 to the predetermined value S2 when the remaining distance L to the object predetermined point P[i] becomes equal to or shorter than the predetermined distance L1 in the current trip. State of charge recovery control is then performed to recover the state of charge SOC of the battery 50 in a next trip by setting the predetermined value S1 to the target state of charge SOC* of the battery 50 at the start of the next trip. More specifically, the "state of charge reduction control" herein denotes controlling the engine 22 and the motors MG1 and MG2, such that the state of charge SOC of the battery 50 becomes close to the predetermined value S2. More specifically, the "state of charge recovery control" herein denotes controlling the engine 22 and the motors MG1 and MG2, such that the state of charge SOC of the battery 50 becomes close to the predetermined value S1 (in the next trip) after the state of charge reduction control is performed.

The configuration that performs the state of charge reduction control in the current trip lowers the state of charge SOC of the battery 50 (to be close to the predetermined value S2) at the end of the current trip or at the start of a next trip, compared with a configuration that does not perform the state of charge reduction control. Compared with a configuration that does not perform the state of charge reduction control and accordingly provides the high state of charge SOC of the battery 50 (to be close to the predetermined value S1), the configuration that performs the state of charge recovery control in the next trip reduces the charge-discharge required power Pb* of the battery 50 (i.e., increases as the value for charging) and thereby increases the required power Pe* to increase the output of the engine 22 during operation of the engine 22 in response to a request for heating the passenger compartment, a request for warming up the engine 22 and a request for warming up the catalyst 25a. This configuration accordingly enables the battery 50 to be charged, while operating the engine 22 at an operation point of high efficiency, ensuring fully sufficient heat for heating, and accelerating the warming-up of the engine 22 and the warming-up of the catalyst 25a. As a result, this improves the energy efficiency.

When the long time parking counter Clp [i] corresponding to the object predetermined point P[i] is smaller than the reference value Clpref at step S180, on the other hand, the HVECU 70 estimates (determines) that the EV switch 89 is turned ON in the predetermined time period T2 since the start of a next trip that is started at the object predetermined point P[i]. The HVECU 70 then terminates this routine without performing the processing of steps S190 to S210. In this case, the target state of charge SOC* of the battery 50 is maintained at the predetermined value S1 until the end of the current trip. In other words, the state of charge reduction control is not performed in the current trip (and the state of charge recovery control is not performed in the next trip).

The configuration that performs the state of charge reduction control in a current trip causes the state of charge SOC of the battery 50 to be lower than the predetermined value S1 (and to be close to the predetermined value S2) at the end of the current trip and at the start of a next trip. When the EV switch 89 is turned ON in the predetermined time period T2 since the start of the next trip (i.e., when the EV switch 89 is turned ON relatively soon), it is likely to shorten a distance and a time drivable in the EV drive mode, because of the low state of charge SOC of the battery 50 (i.e., because of a small amount of dischargeable power). The configuration of the embodiment, on the other hand, maintains (does not increment) the long time parking counter Clp[i], when a long time parking is expected at the predetermined point (object predetermined point P[i]) in a current trip and the EV switch 89 is estimated to be turned ON in the predetermined time period T2 since the start of a next trip that is started at the object predetermined point P[i]. When the long time parking counter Clp[i] is smaller than the reference value Clpref in the current trip, the configuration of the embodiment does not perform the state of charge reduction control. Even when the EV switch 89 is turned ON in the predetermined time period T2 since the start of the next trip (i.e., even when the EV switch 89 is turned ON relatively soon), the configuration of the embodiment accordingly provides the high state of charge SOC of the battery (a large amount of dischargeable power) and thereby suppresses the distance and the time drivable in the EV drive mode from being shortened.

Figure 4:
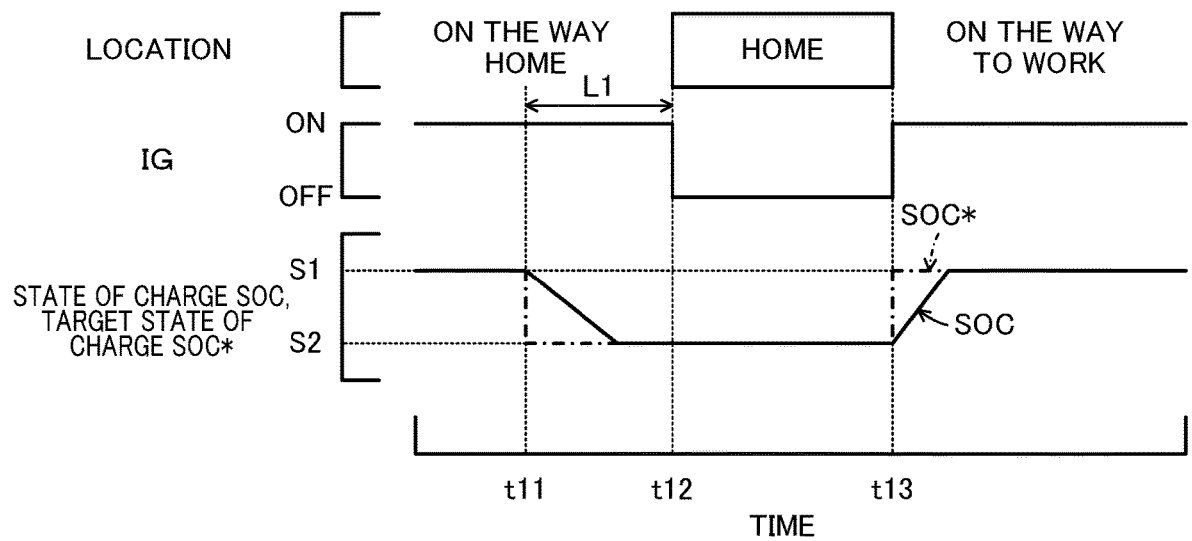
FIG. 4 is a diagram illustrating one example where the user comes home from work and goes to work on a next day.
Figure 5:
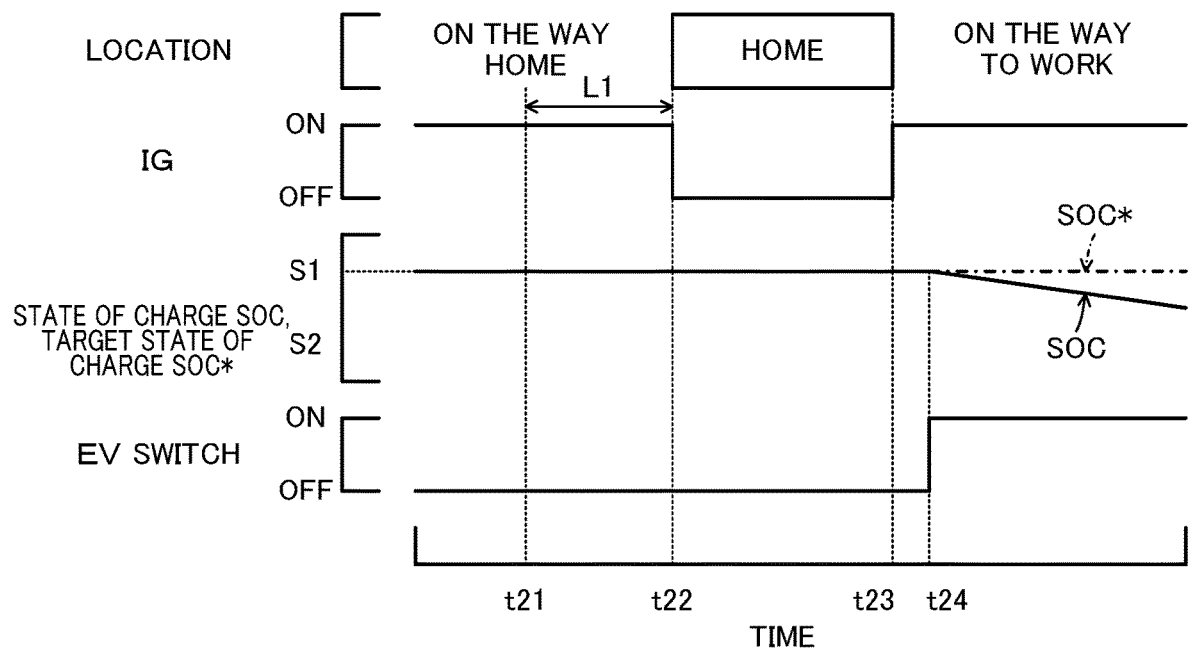
FIG. 5 is a diagram illustrating another example where the user comes home from work and goes to work on a next day.

FIG. 4 and FIG. 5 are diagrams illustrating examples where the user comes home from work and goes to work on a next day. FIG. 4 illustrates the state that the EV switch 89 is estimated to be not turned ON in the predetermined time period T2 since the start of a next trip that is started at the object predetermined point P[i]. FIG. 5 illustrates the state that the EV switch 89 is estimated to be turned ON in the predetermined time period T2 since the start of a next trip that is started at the object predetermined point P[i]. FIGS. 4 and 5 are on the assumption that the user's home is set (registered) as the predetermined point.

In the case of FIG. 4, the state of charge reduction control is performed to control the engine 22 and the motors MG1 and MG2 such that the state of charge SOC of the battery 50 becomes close to the predetermined value S2 that is lower than the predetermined value S1, on the way home from work (for a time period from time t11 to time t12) between the time when the remaining distance L to the object predetermined point P[i] becomes equal to or shorter than the predetermined distance L1 and the time when the user arrives home. On the way to work on a next day (on and after time t13), the state of charge recovery control is performed to control the engine 22 and the motors MG1 and MG2 such that the state of charge SOC of the battery 50 becomes close to the predetermined value S1. This increases the output of the engine 22 during operation of the engine 22 in response to a request for heating the passenger compartment, a request for warming up the engine 22 and a request for warming up the catalyst 25a on the way to work. This accordingly enables the battery 50 to be charged, while operating the engine 22 at an operation point of high efficiency, ensuring fully sufficient heat for heating, and accelerating the warming-up of the engine 22 and the warming-up of the catalyst 25a. As a result, this improves the energy efficiency.

In the case of FIG. 5, the state of charge reduction control is not performed on the way home from work even when the remaining distance L to the object predetermined point P[i] becomes equal to or shorter than the predetermined distance L1 (time t21) before the user arrives home (t22). On the way to work on a next day (on and after time t23), when the EV switch 89 is turned ON (time t24), the state of charge SOC of the battery 50 decreases by driving in the EV drive mode. The configuration that does not perform the state of charge reduction control on the way home from work suppresses the distance and the time drivable in the EV drive mode from being shortened even when the EV switch 89 is turned ON in the predetermined time period T2 since the start of a trip (i.e., even when the EV switch 89 is turned ON relatively soon) on the way to work. The case of FIG. 5 is more likely to occur when the user's home is in a residential area.

As described above, when a long time parking is expected at the object predetermined point P[i] and the EV switch 89 is estimated to be not turned ON in the predetermined time period T2 since the start of a next trip that is started at the object predetermined point P[i], the hybrid vehicle 20 of the embodiment performs the state of charge reduction control in the current trip and performs the state of charge recovery control in the next trip. This improves the energy efficiency. When a long time parking is expected at the object predetermined point P[i] and the EV switch 89 is estimated to be turned ON in the predetermined time period T2 since the start of a next trip that is started at the object predetermined point P[i], on the other hand, the hybrid vehicle 20 of the embodiment does not perform the state of charge reduction control in the current trip (and does not perform the state of charge recovery control in the next trip). This suppresses deterioration of the driving performance when the EV switch 89 is turned ON in the predetermined time period T2 since the start of a next trip (when the EV switch 89 is turned ON relatively soon).

The hybrid vehicle 20 of the embodiment determines whether the EV switch 89 has been turned ON or not in the predetermined time period T2 (for example, about several minutes) since the start of a trip that has been started at the object predetermined point P[i] and sets the EV instruction record flag F2 based on the result of this determination. A modification may determine whether the EV switch 89 has been turned ON or not during a drive to a predetermined distance L2 (for example, about several km) since the start of a trip that has been started at the object predetermined point P[i] and may set the EV instruction record flag F2 based on the result of this determination. The predetermined time period T2 or the predetermined distance L2 is not limited to a fixed time period or a fixed distance but may be a variable time period or a variable distance.

When a long time parking is expected at the object predetermined point P[i], the hybrid vehicle 20 of the embodiment sets the long time parking counter Clp[i] by taking into account the EV instruction record flag F2. A modification may set the long time parking counter Clp[i] by taking into account a silence environment flag F3, in place of the EV instruction record flag F2. The silence environment flag F3 is set to a value 1 when the environment requires silence within a predetermined distance L3 (for example, about several km) from the object predetermined point P[i], while being set to a value when the environment does not require silence. The environment requires silence, for example, when the object predetermined point P[i] is in a residential area. Setting the long time parking counter Clp[i] by taking into account the silence environment flag F3 allows for estimation of whether the EV switch 89 is turned ON or not within the predetermined time period T2 since the start of a next trip that is started at the object predetermined point P[i], based on the environment around the object predetermined point P[i].

Figure 6:
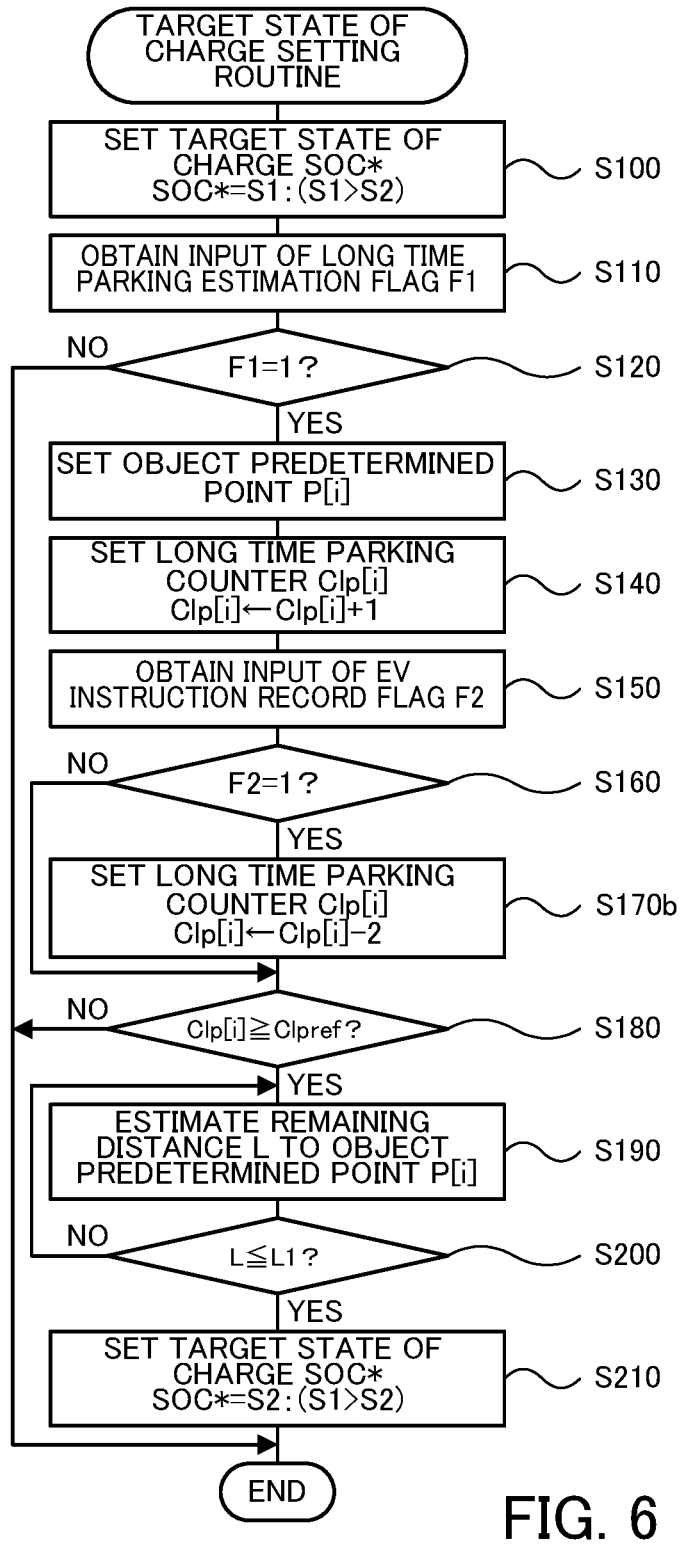
FIG. 6 is a flowchart showing one example of a target state of charge setting routine according to a modification.

In the hybrid vehicle 20 of the embodiment, the HVECU 70 performs the target state of charge setting routine of FIG. 3. A modification may alternatively perform a target state of charge setting routine shown in FIG. 6. The target state of charge setting routine of FIG. 6 is similar to the target state of charge setting routine of FIG. 3, except the processing of step S170b performed in place of the processing of step S170. Like processes are expressed by like step numbers, and their detailed description is omitted.

In the target state of charge setting routine of FIG. 6, when determining at step S120 that the long time parking estimation flag F1 is equal to the value 1, incrementing the long time parking counter Clp[i] corresponding to the object predetermined point P[i] by the value 1 at step 140, and subsequently determining at step S160 that the EV instruction record flag F2 is equal to the value 1, the HVECU 70 determines that the EV switch 89 has been turned ON in the predetermined time period T2 since the start of a last trip that has been started at the object predetermined point P[i]. The HVECU 70 accordingly decrements the long time parking counter Clp[i] by a value 2 (step S170b) and subsequently performs the processing of and after step S180.

When a long time parking is expected at the predetermined point (object predetermined point P[i]) and the EV switch 89 has been turned ON in the predetermined time period T2 since the start of a last trip that has been started at the object predetermined point P[i], the above embodiment maintains (does not increment) the long time parking counter Clp [i]. This modification, on the other hand, decrements the long time parking counter Clp[i] by the value 1. This modified configuration provides the smaller value on the long time parking counter Clp[i] with respect to the higher number of times or at the higher frequency of ON operations of the EV switch 89 in the predetermined time period T2 since the start of each past trip that was started at the object predetermined point P[i] and thereby suppresses the long time parking counter Clp [i] from becoming equal to or larger than the reference value Clpref. As a result, this modified configuration more appropriately estimates (determines) whether the EV switch 89 is turned ON or not in the predetermined time period T2 since the start of a next trip that is started at the object predetermined point P[i] at step S180.

Figure 7:
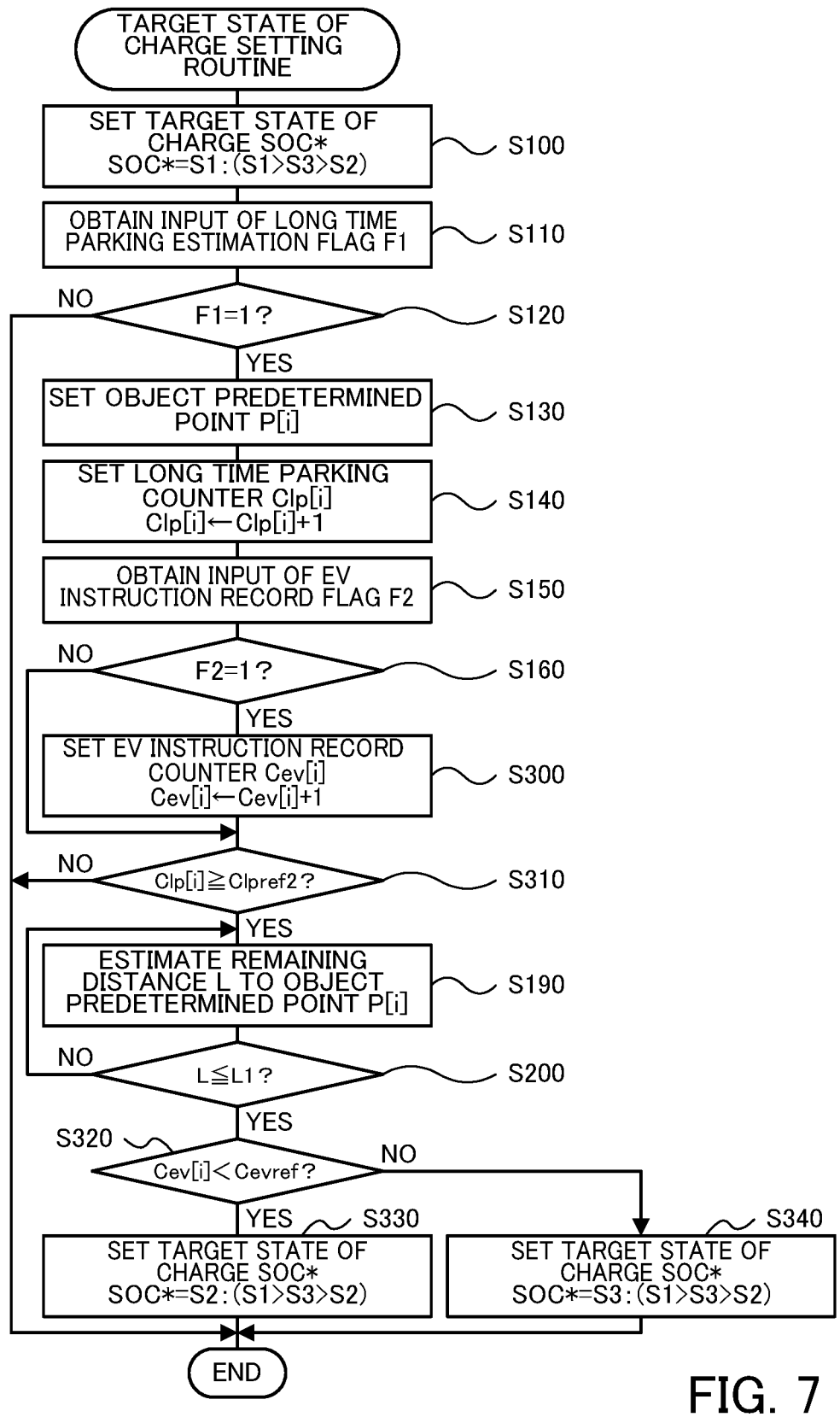
FIG. 7 is a flowchart showing one example of a target state of charge setting routine according to another modification.

In the hybrid vehicle 20 of the embodiment, the HVECU 70 performs the target state of charge setting routine of FIG. 3. Another modification may alternatively perform a target state of charge setting routine shown in FIG. 7. The target state of charge setting routine of FIG. 7 is similar to the target state of charge setting routine of FIG. 3, except the processing of steps S300 and S310 performed in place of the processing of steps S170 and S180 and the processing of steps S320 to S340 performed in place of the processing of step S200. Like processes are expressed by like step numbers, and their detailed description is omitted.

In the target state of charge setting routine of FIG. 7, when the EV instruction record flag F2 is equal to the value 1 at step S160, the HVECU 70 determines that the EV switch 89 has been turned ON in the predetermined time period T2 since the start of a last trip that has been started at the object predetermined point P[i]. The HVECU 70 accordingly increments an EV instruction record counter Cev[i] corresponding to the object predetermined point P[i] by a value 1 (step S300). When the EV instruction record flag F2 is equal to the value 0 at step S160, on the other hand, the HVECU 70 determines that the EV switch 89 has not been turned ON in the predetermined time period T2 since the start of the last trip that has been started at the object predetermined point P[i]. The HVECU 70 accordingly maintains the EV instruction record counter Cev[i] (does not perform the processing of step S300). A value 0 is set as an initial value to the EV instruction record counter Cev[i], for example, at the time of factory shipment.

The HVECU 70 subsequently compares the long time parking counter Clp[i] corresponding to the object predetermined point P[i] with a reference value Clpref2 (step S310). The reference value Clpref2 is a threshold value used to determine whether the state of charge reduction control is allowed or not allowed to be performed in a current trip and may be, for example, a value 3, a value 4 or a value 5. The reference value Clpref2 may be a uniform value for respective predetermined points or may be different values for the respective predetermined points.

When the long time parking counter Clp[i] corresponding to the object predetermined point P[i] is smaller than the reference value Clpref2 at step S310, the HVECU 70 determines that the state of charge reduction control is not allowed to be performed in the current trip and terminates this routine. In this case, the target state of charge SOC* of the battery 50 is maintained at the predetermined value S1 until the end of the current trip.

When the long time parking counter Clp[i] corresponding to the object predetermined point P[i] is equal to or larger than the reference value Clpref2 at step S310, on the other hand, the HVECU 70 determines that the state of charge reduction control is allowed to be performed in the current trip. The HVECU 70 accordingly waits until the remaining distance L to the object predetermined point P[i] becomes equal to or shorter than the predetermined distance L1 (steps S190 and S200) and compares the EV instruction record counter Cev[i] corresponding to the object predetermined point P[i] with a reference value Ceveref (step S320). Like the reference value Clpref described above, the reference value Cevref is a threshold value used to estimate (determine) whether the EV switch 89 is turned ON or not in the predetermined time period T2 since the start of a next trip that is started at the object predetermined point P[i] and may be, for example, a value 3, a value 4 or a value 5. The reference value Cevref may be a uniform value for respective predetermined points or may be different values for the respective predetermined points.

When the EV instruction record counter Cev[i] corresponding to the object predetermined point P[i] is smaller than the reference value Cevref at step S320, the HVECU 70 estimates (determines) that the EV switch 89 is not turned ON in the predetermined time period T2 since the start of a next trip that is started at the object predetermined point P[i]. The HVECU 70 accordingly sets the predetermined value S2 described above to the target state of charge SOC* of the battery 50 (step S330) and then terminates this routine. In this case, state of charge reduction control that is identical with that of the above embodiment is performed in the current trip. This accordingly improves the energy efficiency, like the above embodiment.

When the EV instruction record counter Cev[i] corresponding to the object predetermined point P[i] is equal to or larger than the reference value Cevref at step S320, on the other hand, the HVECU 70 estimates (determines) that the EV switch 89 is turned ON in the predetermined time period T2 since the start of a next trip that is started at the object predetermined point P[i]. The HVECU 70 accordingly sets a predetermined value S3 that is lower than the predetermined value S1 but is higher than the predetermined value S2 to the target state of charge SOC* of the battery 50 (step S340) and then terminates this routine. The predetermined value S3 used here is an approximately middle value between the predetermined value S1 and the predetermined value S2 and may be, for example, 54%, 55% or 56%. In this case, second state of charge reduction control that limits an amount of reduction in the state of charge SOC of the battery 50 compared with the state of charge reduction control, is performed in the current trip. More specifically, the "second state of charge reduction control" denotes controlling the engine 22 and the motors MG1 and MG2, such that the state of charge SOC of the battery 50 becomes close to the predetermined value S3.

The estimation that the EV switch 89 is turned ON in the predetermined time period T2 since the start of a next trip that is started at the object predetermined point P[i] is merely prediction, and it is unknown whether the EV switch 89 is actually turned ON. Such control of this modification suppresses, to some extent, the distance and the time drivable in the EV drive mode from being shortened when the EV switch 89 is turned ON in the predetermined time period T2 since the start of a next trip (i.e., when the EV switch 89 is turned ON relatively soon), compared with the configuration that performs the state of charge reduction control in the current trip. Such control of this modification also improves the energy efficiency to some extent when the EV switch 89 is not turned ON in the predetermined time period T2 since the start of a next trip, compared with a configuration that does not perform the state of charge reduction control at all in the current trip.

Figure 8:
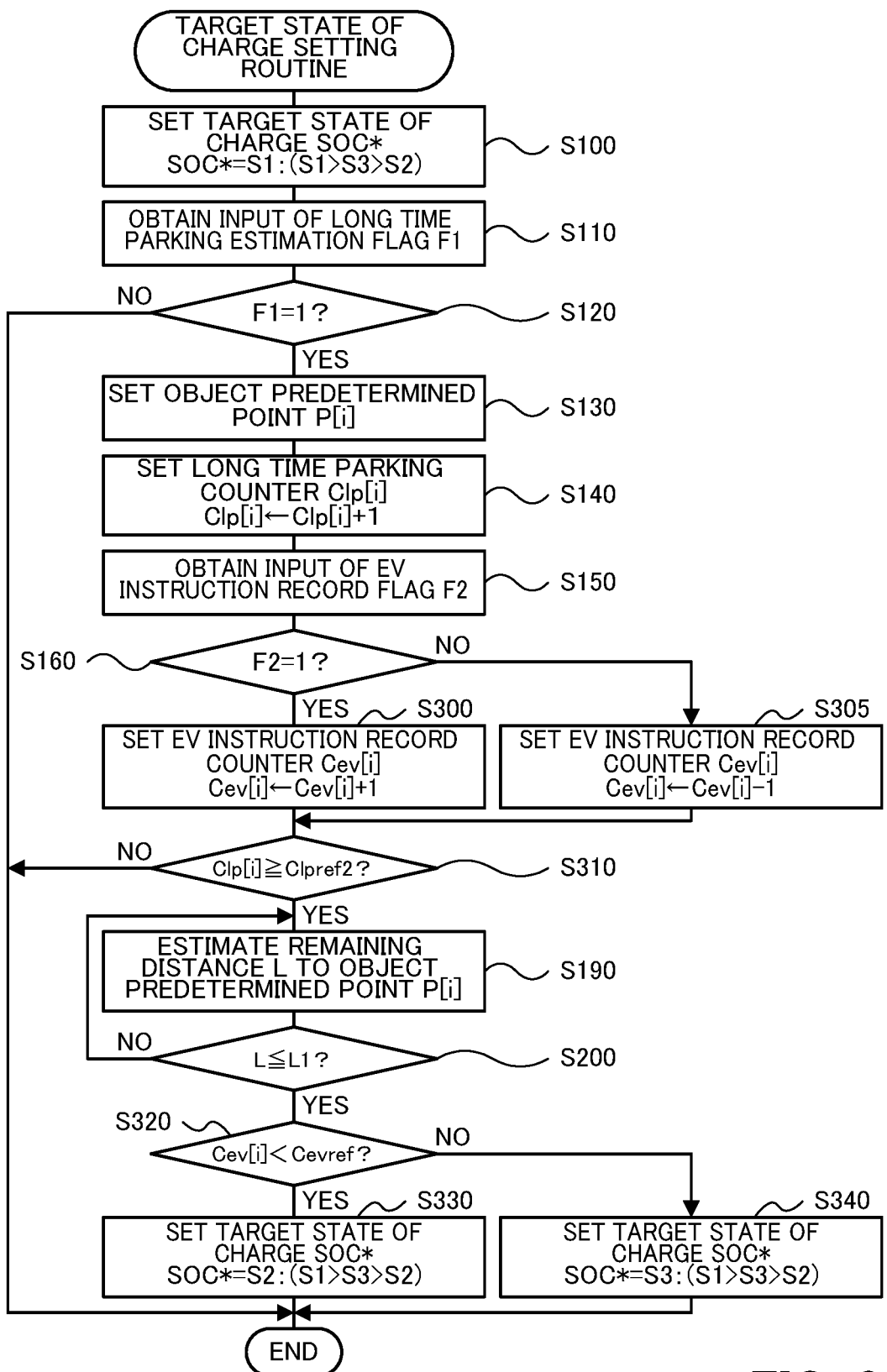
FIG. 8 is a flowchart showing one example of a target state of charge setting routine according to another modification.

In the above modification, the HVECU 70 performs the target state of charge setting routine of FIG. 7. Another modification may alternatively perform a target state of charge setting routine shown in FIG. 8. The target state of charge setting routine of FIG. 8 is similar to the target state of charge setting routine of FIG. 7, except addition of the processing of step S305. Like processes are expressed by like step numbers, and their detailed description is omitted.

In the target state of charge setting routine of FIG. 8, when determining that the EV instruction record flag F2 is equal to the value 0 at step S160, the HVECU 70 determines that the EV switch 89 has not been turned ON in the predetermined time period T2 since the start of a last trip that has been started at the object predetermined point P[i]. The HVECU 70 accordingly decrements the EV instruction record counter Cev[i] by a value 1 (step S305) and subsequently performs the processing of and after step S310.

This modified configuration provides the smaller value on the EV instruction record counter Cev[i] with respect to the higher number of times or at the higher frequency of not-ON operations of the EV switch 89 in the predetermined time period T2 since the start of each past trip that was started at the object predetermined point P[i] and thereby suppresses the EV instruction record counter Cev[i] from becoming equal to or larger than the reference value Cevref. As a result, this modified configuration more appropriately estimates (determines) whether the EV switch 89 is turned ON or not in the predetermined time period T2 since the start of a next trip that is started at the object predetermined point P[i] at step S320.

Figure 9:
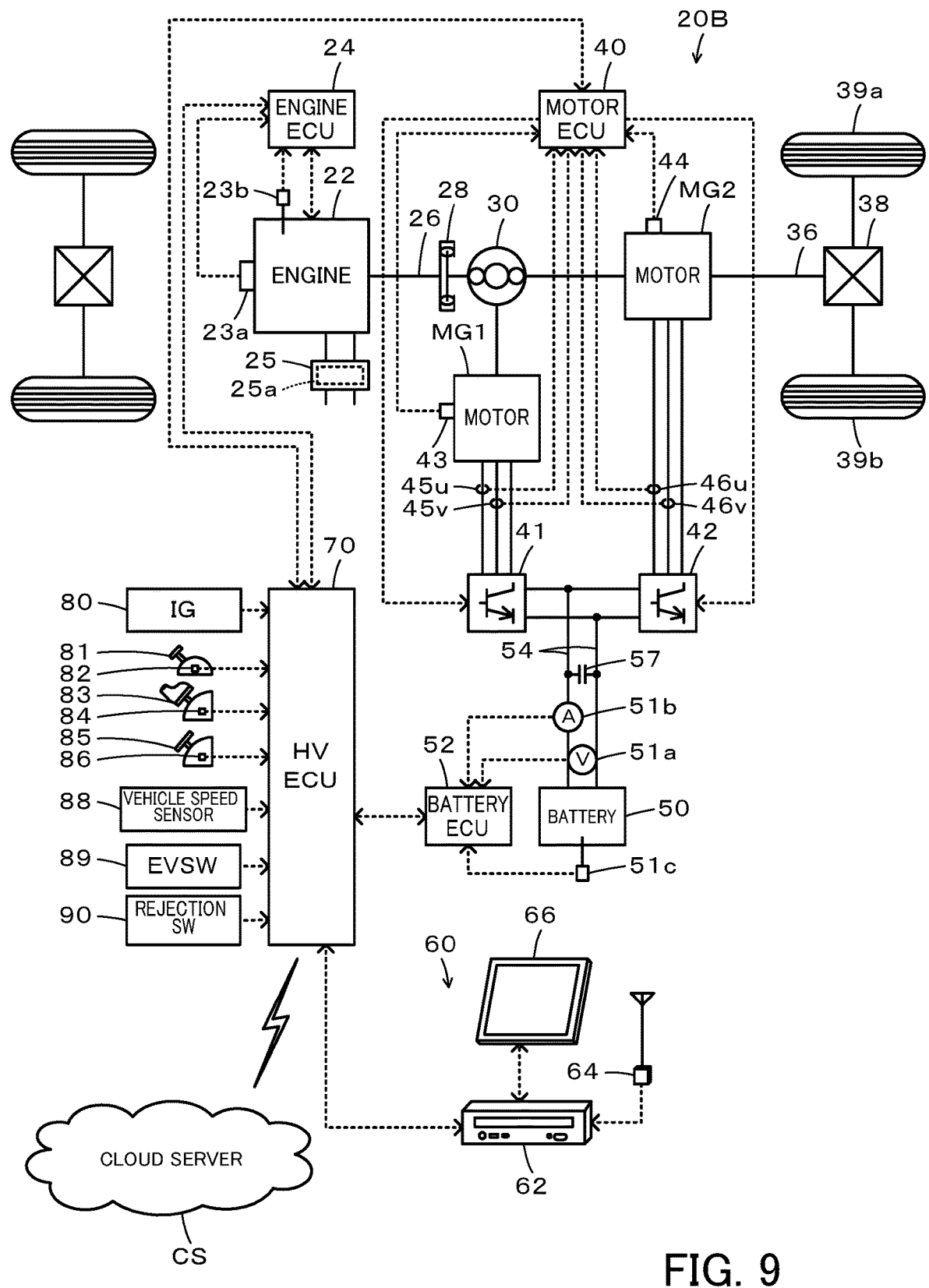
FIG. 9 is a configuration diagram illustrating the schematic configuration of a hybrid vehicle according to a modification.

Like a hybrid vehicle 20B according to a modification shown in FIG. 9, the hybrid vehicle may be further provided with a rejection switch 90 that gives a rejection instruction to reject limitation (including prohibition) of the execution of the state of charge reduction control, in addition to the configuration of the hybrid vehicle 20 according to the above embodiment. In this modified configuration, a rejection signal from the rejection switch 90 is additionally input into the HVECU 70. In the hybrid vehicle 20B of this modified configuration, the HVECU 70 may perform a target state of charge setting routine of FIG. 10 or a target state of charge setting routine of FIG. 11 described below sequentially, in place of the target state of charge setting routine of FIG. 3 or FIG. 7.

Figure 10:
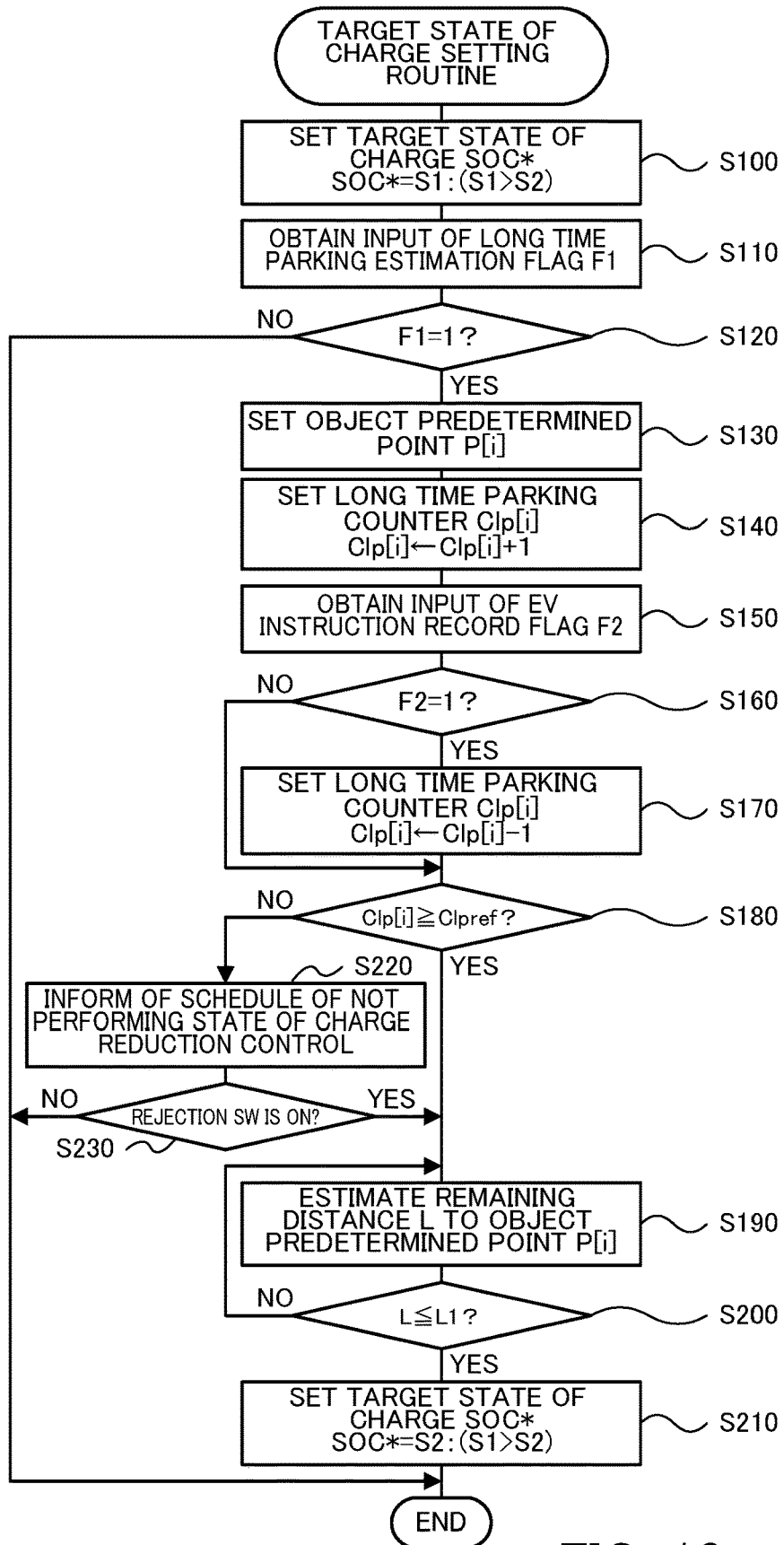
FIG. 10 is a flowchart showing one example of a target state of charge setting routine according to another modification.

The following describes the target state of charge setting routine of FIG. 10. The target state of charge setting routine of FIG. 10 is similar to the target state of charge setting routine of FIG. 3, except addition of the processing of steps S220 and S230. Like processes are expressed by like step numbers, and their detailed description is omitted.

In the target state of charge setting routine of FIG. 10, when the long time parking counter Clp[i] corresponding to the object predetermined point P[i] is smaller than the reference value Clpref at step S180, the HVECU 70 estimates (determines) that the EV switch 89 is turned ON in the predetermined time period T2 since the start of a next trip that is started at the object predetermined point P[i]. The HVECU accordingly informs the user of the schedule of not performing the state of charge reduction control by display on the display 66 or by audio output (step S220) and checks whether the rejection switch 90 is ON or OFF (step S230). When the rejection switch 90 is OFF, the HVECU 70 terminates this routine. In this case, the state of charge reduction control is not performed in the current trip.

When the rejection switch 90 is ON at step S230, on the other hand, the HVECU 70 performs the processing of and after step S190. In this case, the state of charge reduction control is performed in the current trip. Even when it is estimated that the EV switch 89 is turned ON in the predetermined time period T2 since the start of a next trip that is started at the object predetermined point P[i], such control causes the state of charge reduction control to be performed in the current trip with reflection of the user's intention, in response to the ON position of the rejection switch 90. Furthermore, this modification informs the user of the schedule of not performing the state of charge reduction control and thereby enables the user to recognize the schedule and select whether the rejection switch 90 is to be turned ON or not.

Figure 11:
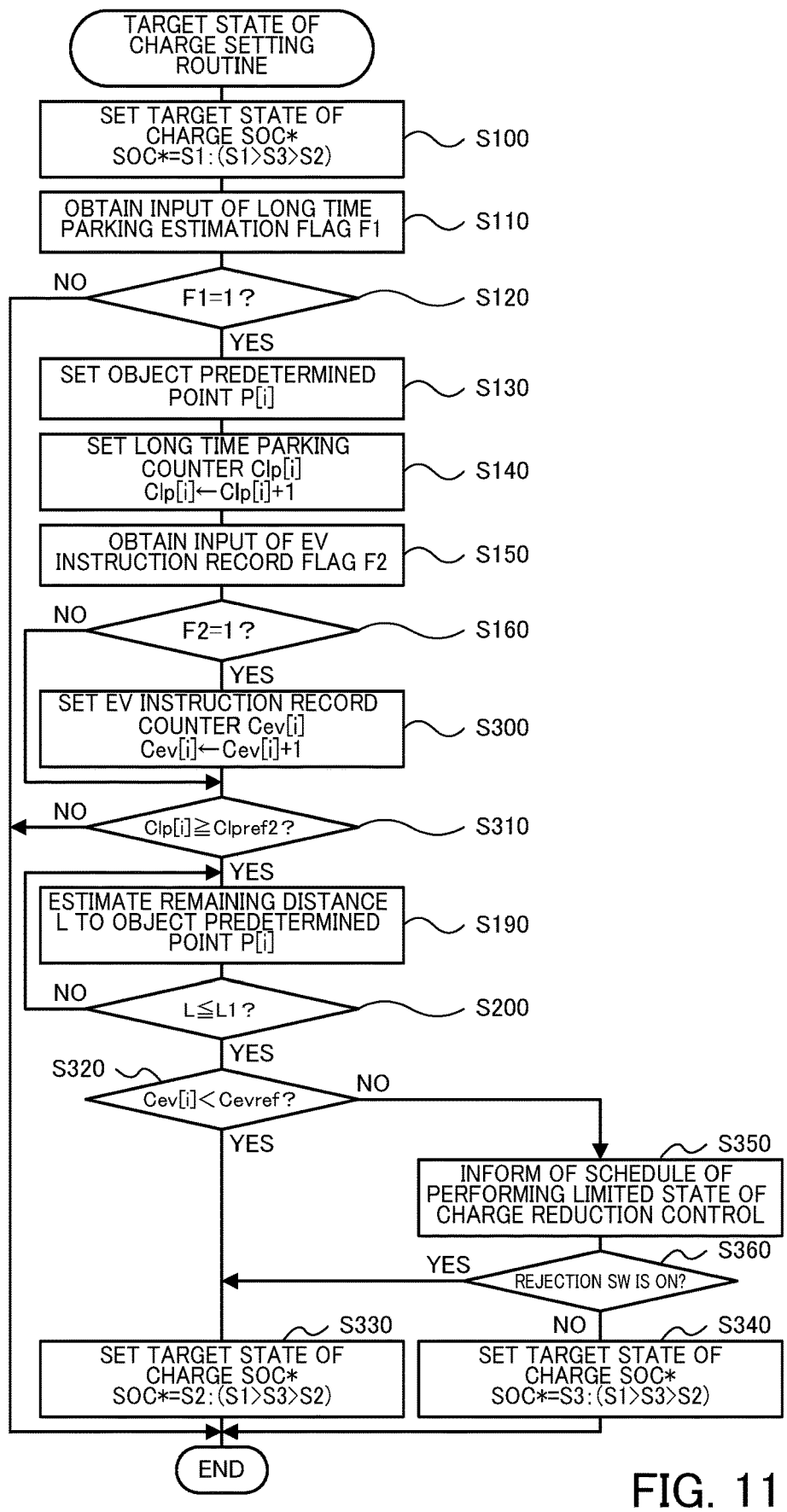
FIG. 11 is a flowchart showing one example of a target state of charge setting routine according to another modification.

The following describes the target state of charge setting routine of FIG. 11. The target state of charge setting routine of FIG. 11 is similar to the target state of charge setting routine of FIG. 7, except addition of the processing of steps S350 and S360. Like processes are expressed by like step numbers, and their detailed description is omitted.

In the target state of charge setting routine of FIG. 11, when the EV instruction record counter Cev[i] corresponding to the object predetermined point P[i] is equal to or larger than the reference value Cevref at step S320, the HVECU 70 estimates (determines) that the EV switch 89 is turned ON in the predetermined time period T2 since the start of a next trip that is started at the object predetermined point P[i]. The HVECU 70 accordingly informs the user of the schedule of not performing the state of charge reduction control (but performing the second state of charge reduction control) by display on the display 66 or by audio output (step S350) and checks whether the rejection switch 90 is ON or OFF (step S360). When the rejection switch 90 is OFF, the HVECU 70 sets the predetermined value S3 to the target state of charge SOC* of the battery 50 (step S340) and then terminates this routine. In this case, the second state of charge reduction control is performed in the current trip.

When the rejection switch 90 is ON at step S360, on the other hand, the HVECU 70 sets the predetermined value S2 to the target state of charge SOC* of the battery 50 (step S330) and then terminates this routine. In this case, the state of charge reduction control is performed in the current trip. Even when it is estimated that the EV switch 89 is turned ON in the predetermined time period T2 since the start of a next trip that is started at the object predetermined point P[i], such control causes the state of charge reduction control to be performed in the current trip with reflection of the user's intention, in response to the ON position of the rejection switch 90. Furthermore, this modification informs the user of the schedule of performing the second state of charge reduction control and thereby enables the user to recognize the schedule and select whether the rejection switch 90 is to be turned ON or not.

The hybrid vehicle 20 of the above embodiment performs the state of charge reduction control to set the predetermined value S2 that is lower than the predetermined value S1 set in the case of not performing the state of charge reduction control, to the target state of charge SOC* of the battery 50. The subject of such setting is, however, not limited to the target state of charge SOC* of the battery 50. According to a modification, the state of charge reduction control may be performed to set a lower value than a value set in the case of not performing the state of charge reduction control, to a starting state of charge SOCst that denotes the state of charge SOC for starting the engine 22 to forcibly charge the battery 50.

The hybrid vehicle 20 of the above embodiment performs the state of charge reduction control to set the predetermined value S2 that is lower than the predetermined value S1 set in the case of not performing the state of charge reduction control, to the target state of charge SOC* of the battery 50. According to a modification, the state of charge reduction control may be performed to set higher values than values set in the case of not performing the state of charge reduction control, to the stop reference value Pstop and the start reference value Pstart, in place of or in addition to the above setting. The subject of such additional or modified setting is, however, not limited to the start reference value Pstart or the stop reference value Pstop with regard to the required power Pe* but may be any other start and stop reference values relating to the driving output of the vehicle. According to a modification, the state of charge reduction control may be performed to set higher values than values set in the case of not performing the state of charge reduction control, to, for example, start and stop reference values with regard to the accelerator position Acc, start and stop reference values with regard to the vehicle speed V, start and stop reference values with regard to the required torque Td*, start and stop reference values with regard to the required power Pd*, start and stop reference values with regard to the actual torque Td of the driveshaft 36, start and stop reference values with regard to the actual power Pd of the driveshaft 36, or start and stop reference values with regard to the actual power Pe of the engine 22.

In the hybrid vehicle 20 of the embodiment, the vehicle-mounted navigation system 60 is used to set a destination, to set an estimated driving route from the current location of the own vehicle to the destination and to perform route guidance of the estimated driving route. According to a modification, a personal digital assistance (for example, a smartphone or a tablet computer) configured to be communicable with the HVECU 70 by wireless communication may be used to set a destination, to set an estimated driving route from the current location of the own vehicle to the destination and to perform route guidance of the estimated driving route. In this modification, the target state of charge setting routine of FIG. 3 may obtain the input of a destination from the personal digital assistance, instead of obtaining the input of a destination from the vehicle-mounted navigation system 60.

The hybrid vehicle 20 of the embodiment is provided with the vehicle-mounted navigation system 60. A hybrid vehicle of a modification may not be provided with the vehicle-mounted navigation system 60.

The hybrid vehicle 20 of the embodiment is a motor vehicle configured without a connector or the like that is connectable with an external power source or more specifically a motor vehicle configured not to perform external charging that charges the battery 50 using electric power from an external power source. The present disclosure may, however, be applied to a motor vehicle that is capable of performing external charging. In this modification, it is preferable to set (register) a point where external charging is not expected to be performed, as the predetermined point. When external charging is expected to be performed during long time parking at the predetermined point, there is little need to perform the state of charge reduction control prior to the long time parking.

The hybrid vehicle 20 of the embodiment uses the battery 50 as the power storage device. The power storage device used may be a capacitor, in place of the battery 50.

The hybrid vehicle 20 of the embodiment includes the engine ECU 24, the motor ECU 40, the battery ECU 52 and the HVECU 70. At least two of these ECUs may be configured by a single electronic control unit.

Figure 12:
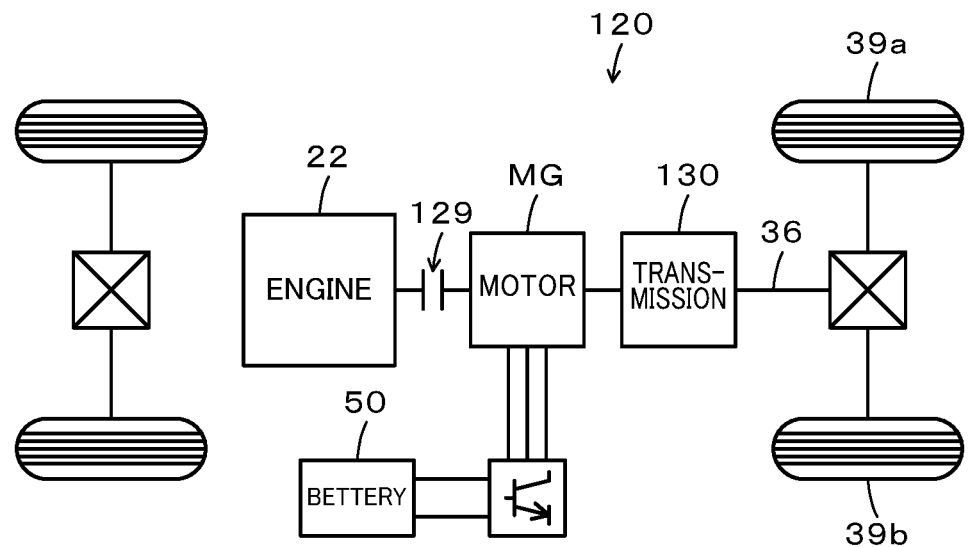
FIG. 12 is a configuration diagram illustrating the schematic configuration of a hybrid vehicle according to a modification.
Figure 13:
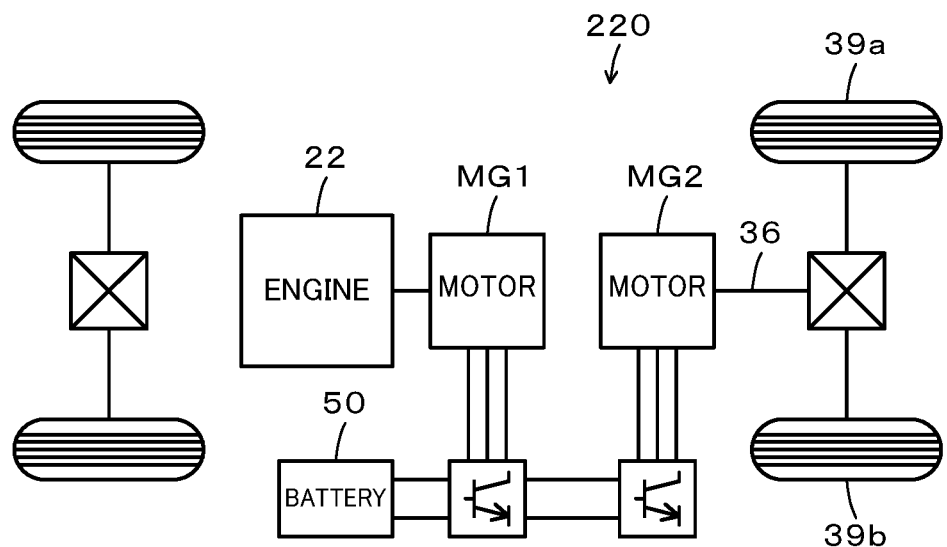
FIG. 13 is a configuration diagram illustrating the schematic configuration of a hybrid vehicle according to a modification.

The hybrid vehicle 20 of the embodiment is configured such that the engine 22 and the motor MG1 are connected via the planetary gear 30 with the driveshaft 36 which is coupled with the drive wheels 39a and 39b, that the motor MG2 is connected with the driveshaft 36, and that the battery 50 is connected with the motors MG1 and MG2 via the power lines. The present disclosure may, however, be applicable to a one-motor hybrid vehicle configured such that a motor MG is connected via a transmission 130 with a driveshaft 36 which is coupled with drive wheels 39a and 39b, that an engine 22 is connected with the motor MG via a clutch 129, and that a battery 50 is connected with the motor MG via power lines, like a hybrid vehicle 120 of a modification shown in FIG. 12. The present disclosure may also be applicable to a series hybrid vehicle configured such that a motor MG1 for power generation is connected with an engine 22, that a motor MG2 for driving is connected with a driveshaft 36 which is coupled with drive wheels 39a and 39b, and that a battery 50 is connected with the motors MG1 and MG2 via power lines, like a hybrid vehicle 220 of another modification shown in FIG. 13.

The embodiment describes the application of the present disclosure to the hybrid vehicle 20. The present disclosure may also be applied to a control device mounted on the hybrid vehicle 20. In this aspect, the HVECU 70, the engine ECU 24, the motor ECU 40 and the battery ECU 52 correspond to the "control device".

In the hybrid vehicle of this aspect, when parking is expected at the predetermined point but the instruction for motor drive is estimated to be given in the predetermined time period or in the predetermined distance since the start of the next trip that is started at the predetermined point, the control device may prohibit execution of the state of charge reduction control in the current trip. This configuration more sufficiently suppresses the motor-drivable distance and time from being shortened when an instruction for motor drive is given in the predetermined time period or in the predetermined distance since the start of a next trip (i.e., when an instruction for motor drive is given relatively soon).

In the hybrid vehicle of this aspect, when parking is expected at the predetermined point, the control device may estimate whether the instruction for motor drive is given in the predetermined time period or in the predetermined distance since the start of the next trip that is started at the predetermined point, based on a number of times or a frequency of the instructions for motor drive or non-instructions for motor drive in the predetermined time period or in the predetermined distance since a start of each past trip that has been started at the predetermined point. This configuration allows for estimation of whether an instruction for motor drive is given in the predetermined time period or in the predetermined distance since the start of a next trip that is started at the predetermined point, based on the past record.

In the hybrid vehicle of this aspect, when parking is expected at the predetermined point, the control device may estimate whether the instruction for motor drive is given in the predetermined time period or in the predetermined distance since the start of the next trip that is started at the predetermined point, based on whether an environment requires silence in a predetermined distance from the predetermined point. This configuration allows for estimation of whether an instruction for motor drive is given in the predetermined time period or in the predetermined distance since the start of a next trip that is started at the predetermined point, based on the environment around the predetermined point. The "environment requires silence" is, for example, when the predetermined point is in a residential area.

In the hybrid vehicle of this aspect, when limitation of execution of the state of charge reduction control is scheduled, the control derive may inform of the schedule. This configuration enables the user to recognize the limitation of execution of the state of charge reduction control.

In the hybrid vehicle of this aspect, even when limitation of execution of the state of charge reduction control is scheduled, the control device may not limit execution of the state of charge reduction control in the current trip, in response to a rejection instruction given to reject limitation of execution of the state of charge reduction control. This configuration enables the user's intention to be more sufficiently reflected.

In the hybrid vehicle of this aspect, the control device may determine whether parking at the predetermined point is expected or not, based on whether a destination is the predetermined point, and when no destination is set by a user, the control device may obtain a destination that is estimated based on a driving record by a vehicle exterior system. Even when no destination is set by the user, this configuration obtains an estimated destination from the vehicle exterior system (for example, a cloud server) and determines whether parking at the predetermined point is expected or not.

In the hybrid vehicle of this aspect, the hybrid vehicle may be a motor vehicle configured not to perform external charging that charges the power storage device using electric power from an external power supply. Further, the hybrid vehicle may be a motor vehicle configured to be capable of performing external charging that charges the power storage device using electric power from an external power supply, and the predetermined point may be a point where the external charging is not expected to be performed. When external charging is expected to be performed during parking at the predetermined point, there is little need to perform the state of charge reduction control prior to the parking at the predetermined point.

The following describes the correspondence relationship between the primary components of the embodiment and the primary components of the disclosure described in Summary. The engine 22 of the embodiment corresponds to the "engine", the motor MG1 and MG2 correspond to the "motor", the battery 50 corresponds to the "power storage device", and the HVECU 70, engine ECU 24, motor ECU 40 and battery ECU 52 correspond to the "control device".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is preferably applicable to the manufacturing industries of the hybrid vehicle and control device mounted thereon and so on.

The invention claimed is:

1. A hybrid vehicle, comprising:
an engine;
a motor;
a power storage device configured to transmit electric power to and from the motor; and
a control device configured to, when parking is expected at a predetermined point, perform state of charge reduction control in a current trip and to perform state of charge recovery control in a next trip, wherein the state of charge reduction control controls the engine and the motor such that state of charge of the power storage device when parking is expected at the predetermined point is lower than the state of charge of the power storage device when parking is not expected at the predetermined point, and the state of charge recovery control controls the engine and the motor such that the state of charge of the power storage device is recovered during operation of the engine, wherein
when parking is expected at the predetermined point but an instruction for motor drive, which causes the hybrid vehicle to be driven without operation of the engine, is estimated to be given in a predetermined time period or in a predetermined distance since a start of a next trip that is started at the predetermined point, the control device limits execution of the state of charge reduction control in the current trip.

2. The hybrid vehicle according to claim 1,
wherein when parking is expected at the predetermined point but the instruction for motor drive is estimated to be given in the predetermined time period or in the predetermined distance since the start of the next trip that is started at the predetermined point, the control device prohibits execution of the state of charge reduction control in the current trip.

3. The hybrid vehicle according to claim 1,
wherein when parking is expected at the predetermined point, the control device estimates whether the instruction for motor drive is given in the predetermined time period or in the predetermined distance since the start of the next trip that is started at the predetermined point, based on a number of times or a frequency of the instructions for motor drive or non-instructions for motor drive in the predetermined time period or in the predetermined distance since a start of each past trip that has been started at the predetermined point.

4. The hybrid vehicle according to claim 1,
wherein when parking is expected at the predetermined point, the control device estimates whether the instruction for motor drive is given in the predetermined time period or in the predetermined distance since the start of the next trip that is started at the predetermined point, based on whether an environment requires silence in a predetermined distance from the predetermined point.

5. The hybrid vehicle according to claim 1,
wherein when limitation of execution of the state of charge reduction control is scheduled, the control derive informs of the schedule.

6. The hybrid vehicle according to claim 1,
wherein even when limitation of execution of the state of charge reduction control is scheduled, the control device does not limit execution of the state of charge reduction control in the current trip, in response to a rejection instruction given to reject limitation of execution of the state of charge reduction control.

7. The hybrid vehicle according to claim 1,
wherein the control device determines whether parking at the predetermined point is expected or not, based on whether a destination is the predetermined point, and
when no destination is set by a user, the control device obtains a destination that is estimated based on a driving record by a vehicle exterior system.

8. The hybrid vehicle according to claim 1,
the hybrid vehicle being a motor vehicle configured not to perform external charging that charges the power storage device using electric power from an external power supply.

9. The hybrid vehicle according to claim 1,
the hybrid vehicle being a motor vehicle configured to be capable of performing external charging that charges the power storage device using electric power from an external power supply, and
the predetermined point is a point where the external charging is not expected to be performed.

10. A control device mounted on a hybrid vehicle, the hybrid vehicle comprising an engine, a motor, and a power storage device configured to transmit electric power to and from the motor,
the control device being configured to, when parking is expected at a predetermined point, perform state of charge reduction control in a current trip and to perform state of charge recovery control in a next trip, wherein the state of charge reduction control controls the engine and the motor such that state of charge of the power storage device when parking is expected at the predetermined point is lower than the state of charge of the power storage device when parking is not expected at the predetermined point, and the state of charge recovery control controls the engine and the motor such that the state of charge of the power storage device is recovered during operation of the engine,
when parking is expected at the predetermined point but an instruction for motor drive, which causes the hybrid vehicle to be driven without operation of the engine, is estimated to be given in a predetermined time period or in a predetermined distance since a start of a next trip that is started at the predetermined point, the control device limiting execution of the state of charge reduction control in the current trip.

* * * * *